US010533400B2

(12) United States Patent
Rogers et al.

(10) Patent No.: US 10,533,400 B2
(45) Date of Patent: Jan. 14, 2020

(54) ANGLED PARTIAL STRAINER PLATES FOR WELL ASSEMBLY (71) Applicant: Halliburton Energy Services, Inc., Houston, TX (US)

(72) Inventors: Henry Eugene Rogers, Oklahoma City, OK (US); Todd Anthony Stair, Spring, TX (US); Chris James Mericas, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 88 days.

(21) Appl. No.: 15/514,998

(22) PCT Filed: Oct. 28, 2014

(86) PCT No.: PCT/US2014/062691
§ 371 (c)(1),
(2) Date: Mar. 28, 2017

(87) PCT Pub. No.: WO2016/068885
PCT Pub. Date: May 6, 2016

(65) Prior Publication Data
US 2017/0211362 A1 Jul. 27, 2017

(51) Int. Cl.
*E21B 43/08* (2006.01)
*B01D 29/58* (2006.01)
*B01D 29/00* (2006.01)

(52) U.S. Cl.
CPC ........ *E21B 43/086* (2013.01); *B01D 29/0095* (2013.01)

(58) Field of Classification Search
CPC ...... E21B 43/08; E21B 43/086; E21B 27/005; B01D 29/58; F01N 3/0215
See application file for complete search history.

(56) References Cited

U.S. PATENT DOCUMENTS 2,202,272 A 5/1940 Smith
2,659,442 A * 11/1953 Sutliff .................. E21B 27/005
137/849

(Continued)

FOREIGN PATENT DOCUMENTS

CA 2684547 10/2008
CA 2962196 5/2016

(Continued)

OTHER PUBLICATIONS

International Patent Application No. PCT/US2014/062691, International Search Report and Written Opinion dated Jul. 27, 2015, 13 pages.

(Continued)

*Primary Examiner* — Shane Bomar
(74) *Attorney, Agent, or Firm* — Kilpatrick Townsend & Stockton LLP (57) ABSTRACT

A downhole assembly can include plates in series along a length of a tubular member. Plates can include particulate-blocking areas and pass-through areas. A pass-through area of a plate can be angularly offset from a pass-through area of another plate in the series. The plates may be angled so that particulate carried by fluid from a wellbore may be trapped by particulate-blocking areas that may be tilted away from the fluid source.

20 Claims, 6 Drawing Sheets

(56) References Cited

U.S. PATENT DOCUMENTS

| | | | |
|---|---|---|---|
| 2,728,553 A | 12/1955 | John | |
| 2,728,599 A | 12/1955 | Moore | |
| 2,874,781 A | 2/1959 | Mcgaffey | |
| 3,425,913 A | 2/1969 | Holden | |
| 3,559,760 A * | 2/1971 | Ninomiya | F01N 1/083 |
| | | | 181/231 |
| 3,747,347 A | 7/1973 | Ciraolo | |
| 3,831,753 A | 8/1974 | Gaylord et al. | |
| 4,154,313 A | 5/1979 | Dysart et al. | |
| 4,341,273 A | 7/1982 | Walker et al. | |
| 4,515,212 A | 5/1985 | Krugh | |
| 4,704,207 A | 11/1987 | Chu | |
| 4,732,677 A | 3/1988 | Thornton | |
| 4,981,368 A | 1/1991 | Smith | |
| 5,100,551 A | 3/1992 | Pall et al. | |
| 5,249,626 A | 10/1993 | Gibbins | |
| 5,423,904 A * | 6/1995 | Dasgupta | B01D 46/0023 |
| | | | 55/282 |
| 6,143,254 A | 11/2000 | Erven et al. | |
| 6,276,452 B1 | 8/2001 | Davis et al. | |
| 6,352,111 B1 | 3/2002 | Bode et al. | |
| 6,382,318 B1 | 5/2002 | Whitlock | |
| 6,574,869 B1 | 6/2003 | McHenry et al. | |
| 6,824,749 B2 | 11/2004 | Leloup et al. | |
| 7,093,653 B2 | 8/2006 | Metcalfe et al. | |
| 7,174,957 B1 * | 2/2007 | Jokhio | E21B 27/005 |
| | | | 166/107 |
| 7,188,687 B2 | 3/2007 | Rudd et al. | |
| 7,188,688 B1 | 3/2007 | LeJeune et al. | |
| 7,472,745 B2 | 1/2009 | Lynde et al. | |
| 8,360,153 B2 | 1/2013 | Ford | |
| 2004/0040703 A1 | 3/2004 | Longmore et al. | |
| 2004/0244988 A1 | 12/2004 | Preston et al. | |
| 2005/0039813 A1 | 2/2005 | Dougherty et al. | |
| 2005/0200127 A1 | 9/2005 | Johnson et al. | |
| 2008/0087419 A1 | 4/2008 | Fair | |
| 2008/0209898 A1 * | 9/2008 | Succi | B01D 45/08 |
| | | | 60/311 |
| 2008/0308274 A1 | 12/2008 | MacDougall et al. | |
| 2009/0226330 A1 * | 9/2009 | Denne | E21B 43/127 |
| | | | 417/45 |
| 2009/0238729 A1 | 9/2009 | Glover et al. | |
| 2011/0024112 A1 * | 2/2011 | Ford | E21B 37/00 |
| | | | 166/278 |
| 2011/0049025 A1 | 3/2011 | Davis et al. | |
| 2011/0192602 A1 | 8/2011 | Yeh et al. | |
| 2012/0292047 A1 | 11/2012 | Knobloch, Jr. et al. | |
| 2013/0025865 A1 | 1/2013 | Knobloch, Jr. et al. | |
| 2013/0341027 A1 | 12/2013 | Xu et al. | |
| 2014/0251894 A1 | 9/2014 | Larson et al. | |
| 2015/0267511 A1 | 9/2015 | Patterson | |
| 2017/0355624 A1 | 12/2017 | Baski | |
| 2018/0266231 A1 * | 9/2018 | Rogers | E21B 27/005 |
| 2018/0363427 A1 * | 12/2018 | Gao | E21B 34/06 |

FOREIGN PATENT DOCUMENTS

| | | |
|---|---|---|
| EP | 2245261 | 9/2013 |
| JP | 07025912 | 5/1995 |
| KR | 1020020092569 | 12/2002 |
| NL | 1021873 | 5/2004 |
| WO | 2014065962 | 5/2014 |
| WO | 2016060648 | 4/2016 |
| WO | 2016068887 | 5/2016 |
| WO | 2016072982 | 5/2016 |
| WO | 2017007447 | 1/2017 |

OTHER PUBLICATIONS

Canadian Patent Application No. 2,962,196, Office Action dated Feb. 8, 2018, 3 pages.
Australian Application No. 2014410220, First Examination Report dated Oct. 11, 2017, 3 pages.
European Application No. 14905178.1, Partial Supplementary European Search Report dated Jan. 31, 2018, 13 pages.
European Patent Application No. EP 14905178.1, Office Action, dated Jan. 30, 2019, 8 pages.
U.S. Appl. No. 15/574,394, "Non-Final Office Action", dated Aug. 19, 2019, 9 pages.

* cited by examiner

ANGLED PARTIAL STRAINER PLATES FOR WELL ASSEMBLY

CROSS-REFERENCE TO RELATED APPLICATIONS

This is a U.S. national phase under 35 U.S.C. 371 of International Patent Application No. PCT/US2014/062691 titled "Angled Partial Strainer Plates For Well Assembly" and filed Oct. 28, 2014, the entirety of which is incorporated herein by reference.

TECHNICAL FIELD

The present disclosure relates generally to devices for use in a wellbore in a subterranean formation and, more particularly (although not necessarily exclusively), to assemblies of strainer plates having pass-through areas that are angularly offset from one another.

BACKGROUND

Preparing a well assembly traversing a hydrocarbon bearing subterranean formation often involves running a string of tubular members (often individually called "tubulars" or "joints") from surface into place in a wellbore. The string can be filled with fluid by permitting wellbore fluid to enter the string, such as through "auto-filling" equipment at a lower-most end of the string. The wellbore fluid can contain debris, such as debris from drilling or another operation. The debris can adversely affect the performance of the auto-fill equipment, which can necessitate filling from surface and the associated costs in time and resources. Additionally or alternatively, debris passing the auto-filling equipment can become trapped in the tubulars. The trapped debris can settle within the tubulars and form masses that can impede or hinder subsequent operations in the wellbore.

DETAILED DESCRIPTION

Certain aspects and examples of the present disclosure are directed to assemblies of strainer plates having pass-through areas that are angularly offset from one another. A strainer assembly can include a series of plates arranged along a length of a tubular member. The strainer plates can have open areas that permit fluid to pass through with particulate or debris carried in the fluid. The plates can be arranged so that a pass-through area of one plate is not directly aligned with an opening in an adjacent plate. For example, a first plate can be rotated relative to a second plate, or the pass-through areas of adjacent plates can be otherwise angularly offset from one another. Angularly offsetting pass-through areas from one another in adjacent plates can cause fluid flow between the plates to twist or turn between the openings and prevent fluid from flowing unimpeded in a straight line through one opening after the next. Twisting or turning fluid between openings can cause at least some debris carried by the fluid to be left in between the plates after the fluid passes through the plates, thereby reducing an amount of debris passing out of the strainer assembly and into a tubular section beyond the strainer assembly.

In some aspects, the plates also include one or more screened sections having holes or perforations that are smaller than the pass-through areas and that can strain particulate from the moving fluid. The plates can be aligned in series so that fluid flowing in a first direction through one pass-through area in a first plate may flow in a straight line along the length of the strainer assembly into a screen section of a subsequent plate to reduce an amount of debris passing out of the strainer assembly. Angularly offset pass-through areas of plates with screened sections can allow fluid flow through the strainer assembly to continue if screens clog or are blocked with accumulated debris.

In some aspects, the plates are angled in the tubular member rather than arranged perpendicularly facing an end of the tubular member. Fluid flow in a first direction can push debris along an angled plate (similar to a ramp) into a corner formed between an edge of the plate and an interior surface of the tubular member to reduce an amount of debris passing out of the strainer assembly.

In some aspects, fluid flow in a second, reversed direction can flush debris out of the strainer assembly. In one example, reversed fluid flow can move debris out of a corner of one angled plate and along an adjacent angled plate toward a pass-through area in the adjacent angled plate. In another example, reversed fluid flow additionally or alternatively can dislodge debris captured in the perforations in the screened section.

These illustrative examples are given to introduce the reader to the general subject matter discussed here and are not intended to limit the scope of the disclosed concepts. The following describes various additional aspects and examples with reference to the drawings in which like numerals indicate like elements, and directional descriptions are used to describe the illustrative aspects. The following uses directional descriptions such as "left," "right," etc. in relation to the illustrative aspects as they are depicted in the figures. Like the illustrative aspects, the numerals and directional descriptions included in the following should not be used to limit the present disclosure.

Figure 1:
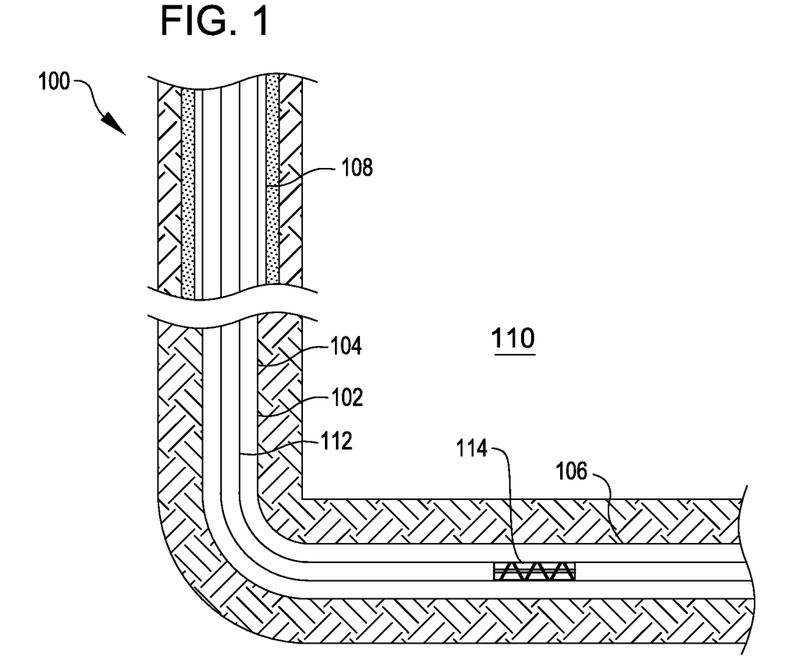
FIG. 1 is a schematic illustration of a well system having a strainer assembly according to certain aspects of the present disclosure.

FIG. 1 schematically depicts an example of a well system 100 having a strainer assembly 114. The well system 100 includes a bore that is a wellbore 102 extending through various earth strata. The wellbore 102 has a substantially vertical section 104 and a substantially horizontal section 106. The substantially vertical section 104 can include a casing string 108 cemented at an upper portion of the substantially vertical section 104. In some aspects, the casing string 108 can extend into the substantially horizontal section 106. The substantially horizontal section 106 (or the substantially vertical section 104 or both) can extend through a hydrocarbon bearing subterranean formation 110.

A tubing string 112 within the wellbore 102 can extend from the surface to the subterranean formation 110. The tubing string 112 can provide a conduit for formation fluids, such as production fluids produced from the subterranean formation 110, to travel from the substantially horizontal section 106 to the surface. Pressure from a bore in a subterranean formation 110 can cause formation fluids, including production fluids such as gas or petroleum, to flow to the surface. In some aspects, the tubing string 112 can provide a conduit for introducing material into the wellbore 102, such as cement for casing operations or fluids for modulating pressure conditions in the wellbore.

The well system 100 can also include a strainer assembly 114. The strainer assembly can be installed in the tubing string 112. The strainer assembly 114 can include features that prevent particulate from moving past the strainer assembly 114 into another part of the tubing string 112, such as when the tubing string 112 is run into the wellbore 102. Features of the strainer assembly 114 can prevent the strainer assembly 114 from clogging due to accumulated particulate. Features of the strainer assembly 114 additionally or alternatively can facilitate flushing the strainer assembly 114 of particulate accumulated in the strainer assembly 114.

Although the well system 100 is depicted with one strainer assembly 114, any number of strainer assemblies 114 can be used in the well system 100. Additionally, although FIG. 1 depicts the strainer assembly 114 in the substantially horizontal section 106, the strainer assembly 114 can be located, additionally or alternatively, in the substantially vertical section 104. In some aspects, strainer assembly 114 can be disposed in simpler wellbores, such as wellbores having only a substantially vertical section. The strainer assembly 114 can be disposed in openhole environments, as depicted in FIG. 1, or in cased wells. Different types of strainer assemblies 114 can be used in the well system 100 depicted in FIG. 1.

Figure 2:
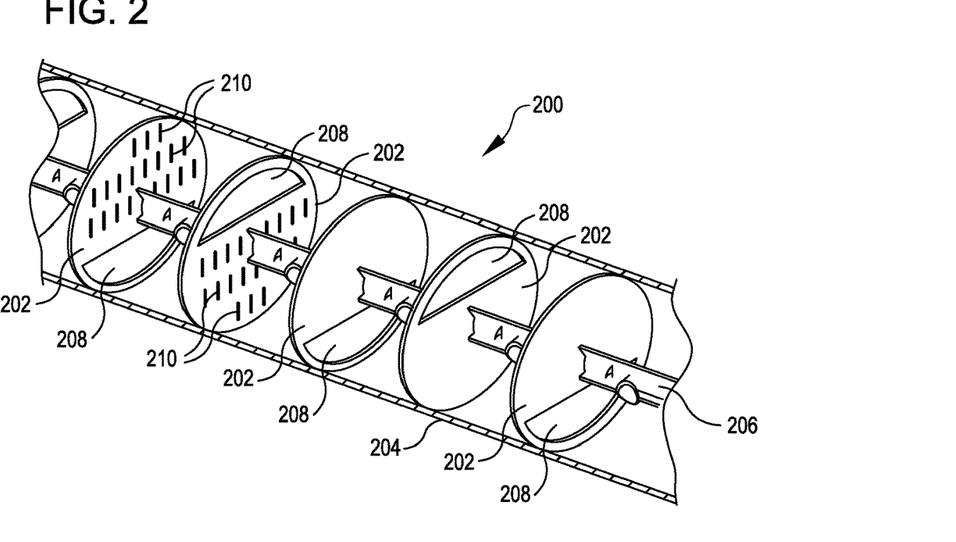
FIG. 2 is a perspective cutaway view of an example of a strainer assembly according to certain aspects of the present disclosure.

FIG. 2 is a perspective, cutaway view of one example of a strainer assembly 200 according to some aspects. The strainer assembly 200 can include a plates 202 positioned within a tubular member 204. In some aspects, the tubular member 204 can form part of a tubing string, such as the tubing string 112 in FIG. 1. In some aspects, the tubular member 204 may be inserted in to a tubing string 112 having an internal diameter that is larger than an external diameter of tubular member 204.

The plates 202 can be supported by a support structure, such as a mandrel 206. The manner or orientation in which the plates 202 are coupled with the mandrel 206 can determine a relative orientation of the plates 202 to one another. The relative arrangement of the plates 202 can align features of the plates 202 to reduce an amount of fluid-borne particulate that can pass through the strainer assembly 200.

A plate 202 can span a portion of a bore of the tubular member 204. For example, a plate 202 can be circularly shaped to match a circular bore shape of the tubular member 204.

A plate 202 can include a corresponding pass-through area 208. The pass-through area 208 can be an opening of sufficient size to allow fluid carrying particulate or debris to flow from a one side of the plate 202 to another, opposite side of the plate. In some aspects, the pass-through area 208 is positioned near an end or edge of a plate 202. As examples, the pass-through area 208 can be formed as a passage through the plate 202 (such as shown in FIG. 2) or as a gap between an edge of the plate 202 and an interior surface of the tubular member 204.

The pass-through area 208 can be positioned radially from a central axis of the tubular member 204. The plates 202 can be arranged such that pass-through areas 208 of adjacent plates 202 are positioned at different angular positions within the tubular member 204. The pass-through areas 208 can be angularly offset from one another. For example, the plates 202 can be arranged so that proximate pass-through areas 208 alternate between bordering a top of the tubular member and bordering a bottom of the tubular member (e.g., offset from one another by 180 degrees), as shown in FIG. 2. Pass-through areas 208 additionally or alternatively can be offset from one another by any other suitable amount or angular increment, and are not limited to an offset of 180 degrees. For example, although a uniform offset between each pass-through area 208 is shown in FIG. 2, the offset between one pass-through area 208 and an immediately succeeding pass-through area 208 may differ from the offset between the pass-through area 208 and an immediately preceding pass-through area 208. Furthermore, although plates 202 and pass-through areas 208 are depicted in FIG. 2 as uniform features, these features may also vary from one another in size, shape, thickness, and orientation.

In some aspects, at least some of the plates 202 include a screened section having perforations 210 through the plates 202. The perforations 210 can be sized to permit the passage of fluid through the plates 202, yet block passage of particulate carried by the fluid. A screened section can be formed in a plate 202 in any suitable manner, including, but not limited to, making perforations 210 directly in the plate 202 or stretching a mesh defining the perforations 210 across an open portion of the plate 202. A screened section can include any suitable number of perforations 210. In some aspects, perforations 210 substantially cover an entire area of the plate 202 not occupied by the pass-through area 208. In some aspects, smaller portions of the plate 202 include one or more screened sections with perforations 210.

Figure 3:
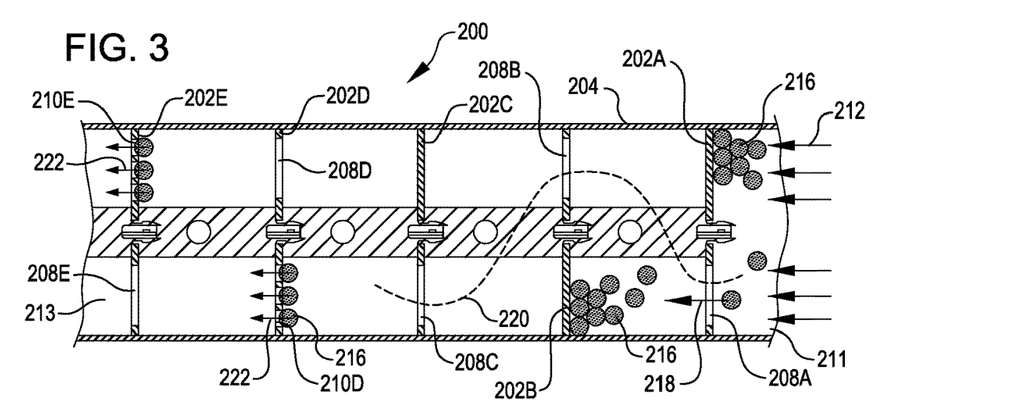
FIG. 3 is a side, cross-sectional view of the strainer assembly of FIG. 2, showing an example of fluid and particulate flow in a first direction according to certain aspects of the present disclosure.

FIG. 3 is a side cross-sectional view of the strainer assembly 200, illustrating an example of fluid and particulate flow in a first direction according to some aspects. Fluid can enter a first side 211 of the tubular member 204 (e.g., the right end in FIG. 3), as depicted by arrows 212 in FIG. 3. For example, the tubular member 204 can be moved within a wellbore 102 in a direction depicted to the right in FIG. 3, causing a flow of fluid in the leftward direction of FIG. 3. The fluid alternatively or additionally can be directed into the first end 211 of the tubular member 204 by auto-fill equipment or the like. The fluid entering the first end 211 of the tubular member 204 can convey particulate, including individual particles 216 (depicted in an enlarged manner for ease of visibility). The mandrel 206 can have closed ends, preventing passage of fluid through the mandrel 206.

The offset between pass-through areas 208 can route fluid along a tortuous path as the fluid flows past adjacent plates 202. For example, fluid flowing in from the first end 211 of the tubular member 204 can flow along the tortuous path depicted by the dashed line 220 in FIG. 3. The fluid flows through a pass-through area 208A of the first plate 202A, carrying particles through the pass-through area 208A, such as depicted by arrow 218. Fluid flow through the first pass-through area 208A encounters the second plate 202B, causing the fluid flow to make a first turn to pass through a second pass-through area 208B. Fluid flow continuing through the second pass-through area 208B turns to flow through a third pass-through area 208C of the third plate 202C.

Changes in direction from the tortuous path can remove particles 216 from the fluid passing through the strainer assembly 200. For example, the particles 216 can be carried by momentum against a second plate 202B and dropped while the fluid changes direction between adjacent pass-through areas 208C, 208B that are offset from one another. In another example, the changes of direction from the tortuous path can reduce a speed of the fluid flow, thereby increasing a number of particles 216 that can drop or settle out of the fluid under the effects of gravity.

In some aspects, the tortuous path additionally or alternatively can yield other benefits. For example, routing cement through the tortuous path of the strainer assembly 200 during a cementing operation may provide additional mixing for the cement and improve the quality of the cementing operation or the overall displacement efficiency of a section of a tubular 112 having the strainer assembly 200.

In some aspects, perforations 210D, 210E in at least some of the plates 202D, 202E can additionally or alternatively remove particles 216 from the fluid passing through the strainer assembly 200. For example, a portion of fluid can travel through perforations 210D in the plate 202D (as depicted by arrow 222), leaving particles 216 behind on the plate 202D due to the particles 216 being too large to fit through the perforations 210D. In some aspects, although accumulation of particles 216 in the perforations 210 may block fluid passage there through, fluid can flow through the strainer assembly 200 along the pass-through areas 208.

Figure 4:
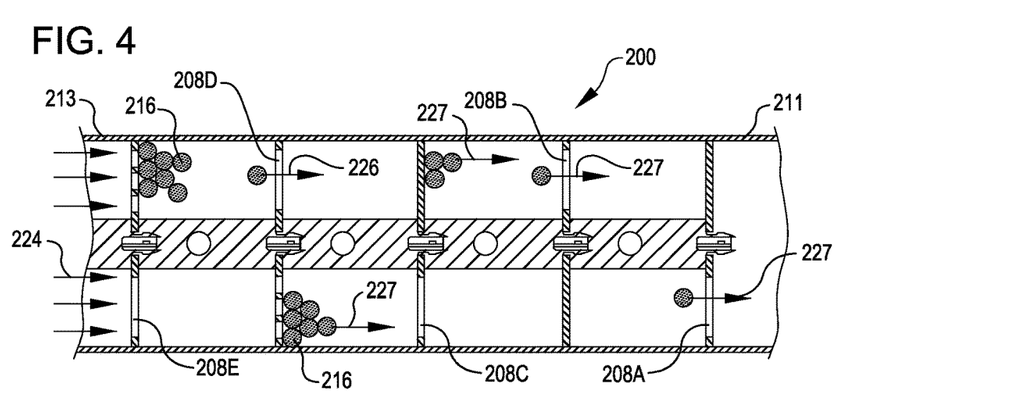
FIG. 4 is a side, cross-sectional view of the strainer assembly of FIGS. 2-3, showing an example of fluid and particulate flow in a second direction according to certain aspects of the present disclosure.

FIG. 4 is a side cross-sectional view of the strainer assembly 200, showing an example of fluid and particulate flow in a second direction according to some aspects. Fluid can enter the strainer assembly from a second end 213, such as shown by arrow 224. The fluid entering from the second end 213 can include fewer particles 216 than fluid entering the strainer assembly 200 from the first end 211 (such as the fluid discussed above with respect to the arrow 212 of FIG. 3). As examples, the fluid entering from the second end 213 may include fewer particles 216 as a result of having passed through strainer assembly 200, as a result of being introduced from a surface of the wellbore 102, or both. The fluid entering from the second end 213 can flush particles 216 out of the strainer assembly 200 and prepare the strainer assembly 200 for further straining or filtering in subsequent operations.

For example, fluid flowing through perforations 210E can dislodge particles 216 accumulated in the perforations 210E. The fluid flowing from the second end 213 of the strainer assembly 200 can direct the dislodged particles 216 towards and through a pass-through area 208D of a next plate 202D along the length of the strainer assembly 200, as shown by arrow 226 in FIG. 4. In some aspects, passage of the fluid from the second end 213 through pass-through areas 208 additionally or alternatively can cause suction that can sweep previously trapped particles away from plates 202 and towards openings or pass-through areas 208 in subsequent plates 202, such as shown by arrows 227 in FIG. 4.

Figure 5:
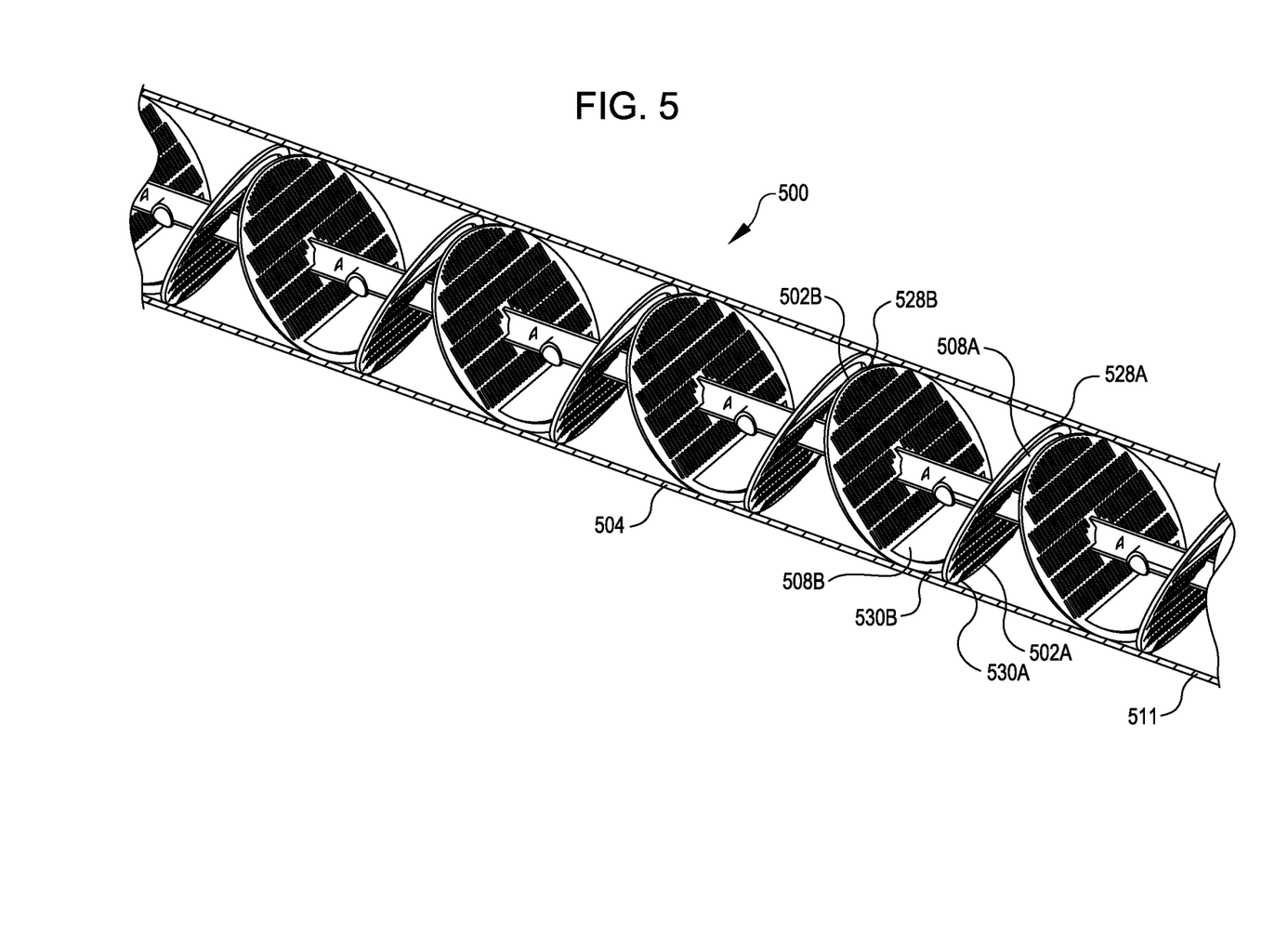
FIG. 5 is a perspective cutaway view of another example of a strainer assembly according to certain aspects of the present disclosure.

FIG. 5 is a perspective cutaway view of another example of a strainer assembly 500 according to some aspects. The strainer assembly 500 can share some similarities with the strainer assembly 200 described above with respect to FIGS. 2-4 and can additionally or alternatively include other features. For example, the strainer assembly 500 can include plates 502 (e.g., 502A, 502B) and pass-through areas 508 (e.g., 508A, 508B).

The plates 502 can be angled relative to a length of the tubular member 504. For example, the plates 502 can be tilted from a position perpendicular to a length of the tubular member 504. Any plate 502 can span an elongate or longitudinal section of the bore of the tubular member 504. One or more of the plates 502 can be elliptically shaped, which can facilitate the plate 502 spanning an elongate or longitudinal section of the bore of the tubular member 504.

In some aspects, the plates 502 can be angled in an alternating manner along a length of the tubular member 504. For example, the plates 502 may alternate an angle of tilt so that adjacent plates 502 form a V-shape. In one illustrative example, a first plate 502A can have a top side 528A tilted forward from a perpendicular position and toward a first end 511 of the tubular member 504, while a second adjacent plate can have a top side 528B tilted backward from a perpendicular position and away from the first end 511 of the tubular member 504. The bottom sides 530A, 530B of the plates 502A, 502B can be adjacent to one another to form a point of the V-shape. In some aspects, the bottom sides 530A, 530B are spaced apart and not immediately adjacent one another.

Figure 6:
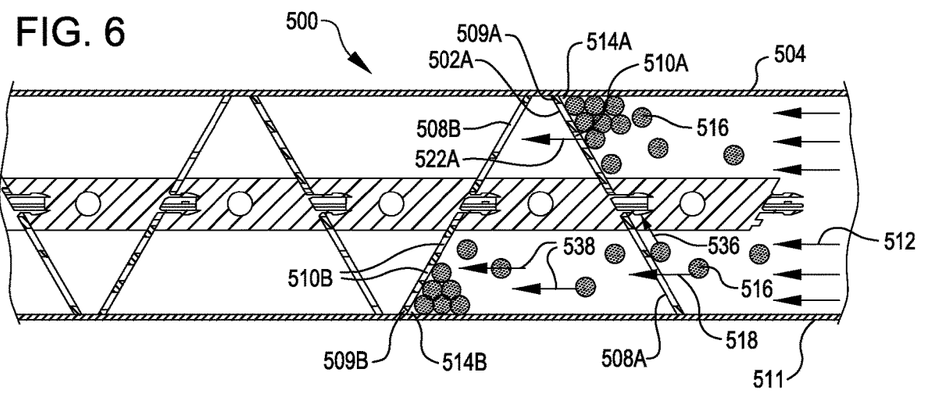
FIG. 6 is a side, cross-sectional view of the strainer assembly of FIG. 5, showing an example of fluid and particulate flow in a first direction according to certain aspects of the present disclosure.

FIG. 6 is a side cross-sectional view of the strainer assembly 500, showing an example of fluid and particulate flow in a first direction according to certain aspects. A first plate 502A in the strainer assembly 500 can be tilted. The tilt may angle the pass-through area 508A of the first plate 502A toward the first end 511 of the tubular member 504. The tilt may also cause an opposite closed end 509A of the plate 502A to be angled away from the first end 511 of the tubular member 504. Angling the plate 502 in this manner can form a ramp along the plate 502A toward a corner 514A formed between an edge of the plate 502A and an interior surface of the tubular member 504.

In some aspects, particles 516 encountering a plate 502 can be moved along an angle of the plate 502 by fluid flow. For example, the fluid entering the tubular member 504 from the first end 511 can push particles 516 along the ramp formed by the angled plate 502A, such as illustrated by arrow 536. The particles 516 can be moved along the angled plate 502A toward the corner 514A formed between an edge of the plate 502A and an interior surface of the tubular member 504. Moving particles 516 toward the corner 514A can clear particles 516 from perforations 510A, if present. Clearing the perforations 510 can allow additional fluid to travel through perforations 510A in the plate 502A (as depicted by arrow 522A) and increase an amount of particles 516 that are screened out of the fluid.

A next plate 502B in the series in the strainer assembly 500 can be tilted at a different angle relative to the bore of the tubular member 504. The second plate 502B can be tilted so that the second pass-through area 508B is tilted toward the source of fluid flow (e.g., toward the first end of the tubular member 504) and so that the closed end 509B forming a corner 514B is tilted away from the source of fluid flow. This may longitudinally align corner 514B or the closed end 509B (or both) with the pass-through area 508A. Altering the tilt of plates 502 along with the angular position of the pass-through areas 508 can allow particles 516 to be consistently pushed toward corners 514 and away from pass-through areas 508. For example, some particles 516 may pass through the pass-through area 508A instead of being directed along the angled plate 502A toward the corner 514A. These particles passing through the pass-through area 508A can be directed by a longitudinal flow of fluid toward the corner 514B that is longitudinally aligned with the pass-through area 508A, such as illustrated by arrows 538.

If perforations 510 of a plate 502 are omitted or become blocked by accumulated particles 516, fluid laden with particles 516 can still pass through the pass-through area 508 of the plate 502. For example, fluid coming from the first end of the tubular member 504 as depicted by arrows 512 can pass through the pass-through area 508A (as depicted by arrow 518) even if perforations 510A are blocked or omitted. If perforations 510B are also blocked or omitted, the fluid may travel along a fluid path between the pass-through area 508A and pass-through area 508B. The offset between the pass-through area 508A and pass-through area 508B can provide a tortuous path for the fluid flow, such as described above with respect to FIG. 3.

Figure 7:
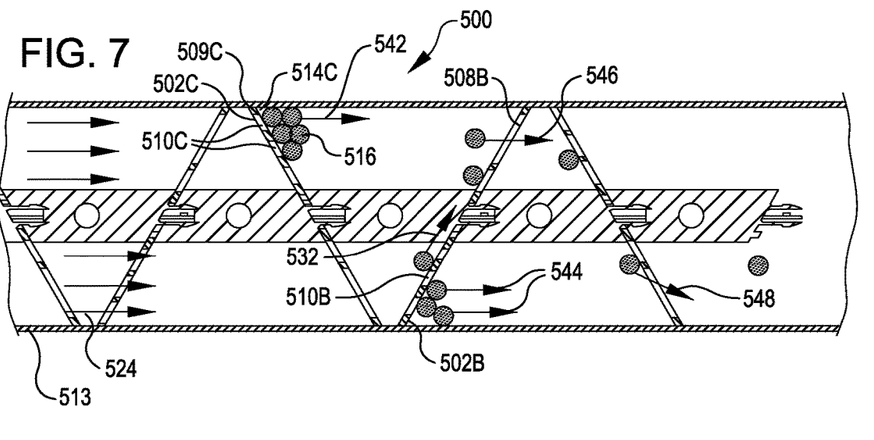
FIG. 7 is a side, cross-sectional view of the strainer assembly of FIGS. 5-6, showing an example of fluid and particulate flow in a second direction according to certain aspects of the present disclosure.

FIG. 7 is a side cross-sectional view of the strainer assembly 500, showing an example of fluid and particulate flow in a second direction according to some aspects. Fluid can enter the strainer assembly from a second end 513, such as shown by arrow 524. The fluid entering from the second end 513 can flush particles 516 out of the strainer assembly 500 and prepare the strainer assembly 200 for additional operations.

Fluid flowing through perforations 510C can dislodge particles 516 accumulated in the corner 514 between the plate 502C and an interior surface of the tubular member 504. Fluid flowing from the second end 513 of the strainer assembly 500 can direct the particles 516 towards a next plate 502B along the length of the strainer assembly 500, such as illustrated by arrow 542. Particles reaching the next plate 502B can be directed along the angle of the plate 502B toward the pass-through area 508B (such as illustrated by arrow 532) and pass through the pass-through area 508B (such as illustrated by arrow 546).

When fluid flows from the second end 513 of the strainer assembly 500 along the plates 502, the pass-through areas 508 are angled away from the source of fluid, while the closed end 509 of the plate is oriented toward the source of fluid. Such orientation can provide a ramp for urging particles toward the pass-through area 508. The particles can, therefore, be sequentially pushed through openings or pass-through areas 508 and pushed out of the strainer assembly 500 (as illustrated by arrow 548). Additionally, the angle can push the particles 516 away from perforations 510B, as depicted by arrow 532. This can clear the perforations 510B and permit additional fluid to flow through and dislodge additional particles previously trapped by the perforations 510B, as illustrated by arrows 544.

Figure 8:
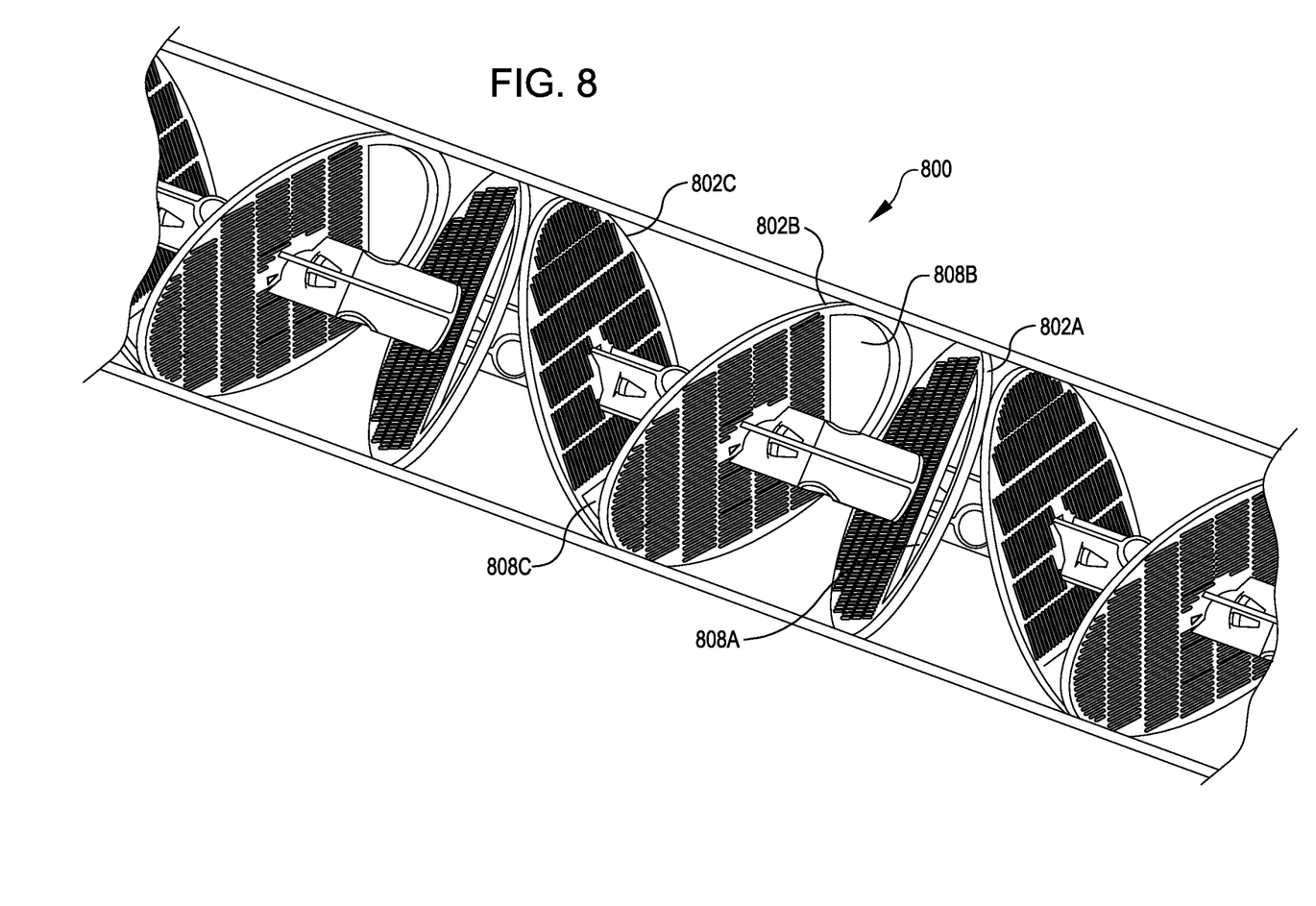
FIG. 8 is a perspective cutaway view of another example of a strainer assembly according to certain aspects of the present disclosure.

FIG. 8 is a perspective cutaway view of another example of a strainer assembly 800 according to some aspects. Strainer assembly 800 includes plates 802 (such as plates 802A, 802B, and 802C) arranged with pass-through areas 808 (such as 808A, 808B, and 808C) arranged at a different angular offset than the strainer assemblies depicted elsewhere herein. For example, whereas the strainer assembly 500 of FIG. 5 illustrates the pass-through areas 508 offset by approximately 180 degrees, the pass-through areas 808 in the strainer assembly 800 are oriented at approximately 120-degree offsets. Such an orientation can reduce a sensitivity of the strainer assembly 800 to the direction of gravity. For example, the arrangement of the strainer assembly 800 can improve the likelihood that at least one pass-through area 808 may be oriented toward the direction of gravity. This can facilitate a greater degree of settling of particles due to gravity in between the plates 802. As can be appreciated, although offsets of 120 degrees and 180 degrees have been explicitly described and shown herein, any offsets can be used in which fluid passing through sequential pass-through areas in the series may be oriented at different angular positions relative to the bore of the tubular member.

Figure 9:
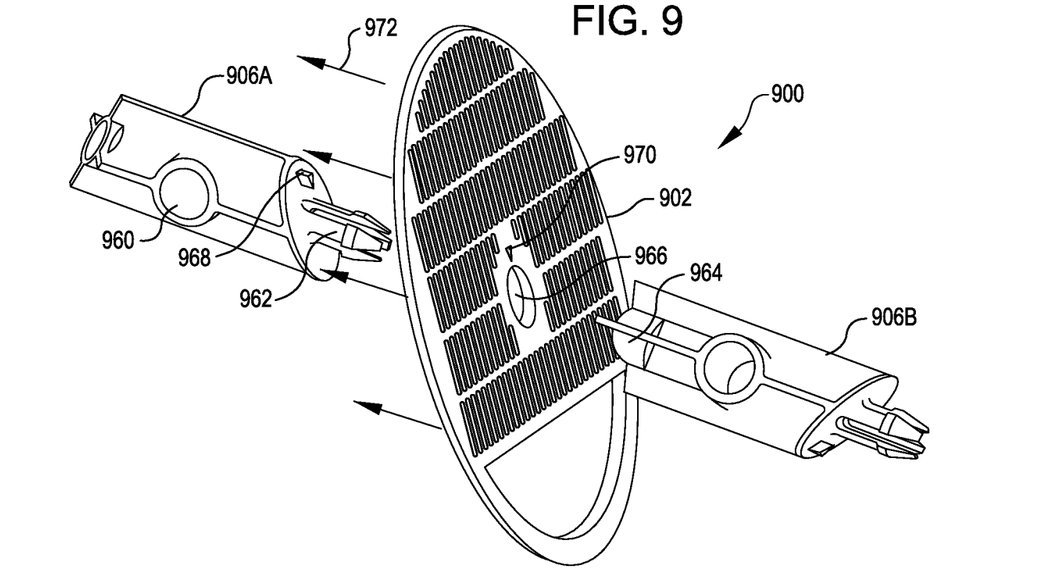
FIG. 9 is a perspective view of an example of components of a strainer assembly according to certain aspects of the present disclosure.

FIG. 9 is a perspective view of an example of components of a strainer assembly 900 according to some aspects. The strainer assembly 900 can include a modular mandrel 906 or other support structure, which may include at least a first mandrel section 906A and a second mandrel section 906B.

The first mandrel section 906A can include features to facilitate connection with plates 902 and other mandrel sections, such as the second mandrel section 906B. For example, the first mandrel section 906A can include a notch 960. The notch 960 can extend through the first mandrel section 906A transverse to a length of the first mandrel section 906A. A bar or other leverage-providing component can be inserted into the notch 960 to provide a pushing surface by which a person can join the first mandrel section 906A with another mandrel section 906B.

The second mandrel section 906B can include a collar 964. A mating protrusion 962 on the first mandrel section 906A can be inserted into the collar 964 to connect the first mandrel section 906A with the second mandrel section 906B. The protrusion 962 can extend through a central opening 966 (or opening 966 positioned other than centrally) of a plate 902 for coupling the plate 902 to the mandrel section 906A. The mandrel section 906A can also include an aligning feature 968, such as a key for insertion into a slot 970 in the plate 902 so that the plate 902 aligns as desired relative to the first mandrel section 906A. For example, the plate 902 can be translated onto an end of the first mandrel section 906A, such as depicted by arrows 972.

Figure 10:
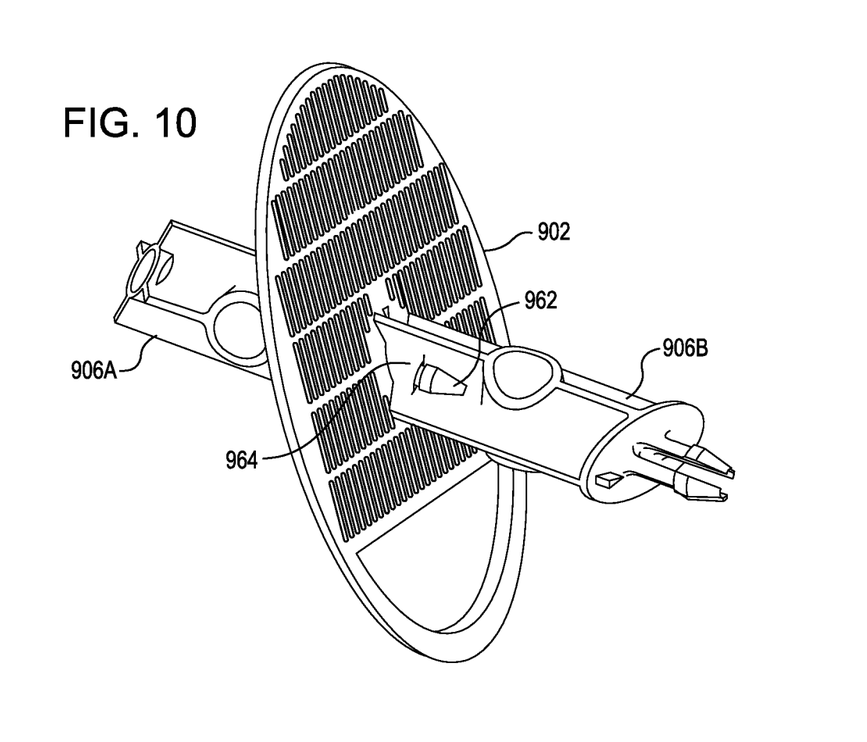
FIG. 10 is a perspective view of the components of FIG. 9 in an assembled state according to certain aspects of the present disclosure.

FIG. 10 is a perspective view of the components of FIG. 9 in an assembled state according to some aspects. The second mandrel section 906B can be installed over the protrusion 962 of the first mandrel section 906A extending through the plate 902. The protrusion 962 can include spikes that extend through the collar 964 to secure the first mandrel section 906A and the second mandrel section 906B with the plate 902 attached there between. As can be appreciated, the components of the strainer assembly 900 can be collectively assembled and inserted into a tubular member 204 or can be assembled by adding additional mandrel sections and plates to an assembly already positioned within a tubular member 204. Additionally, the components of the strainer assembly 900 can be transported to a worksite in an already-assembled fashion or an unassembled fashioned for construction at the site.

In some aspects, a downhole assembly, a system, or a method is provided according to one or more of the following examples or according to some combination of the elements thereof. In some aspects, a tool or a system described in one or more of these examples can be utilized to perform a method described in one of the other examples.

EXAMPLE #1

Provided can be a downhole assembly, comprising a plurality of plates arranged in a series along a length of a tubular, each plate of the plurality of plates comprising (i) a pass-through area that is angularly offset from a pass-through area of another plate in the series, and (ii) a particulate-blocking area.

EXAMPLE #2

Provided can be the downhole assembly of Example #1, wherein at least one of the plates of the plurality of plates comprises a particulate-blocking area having a screened section comprising perforations through the screened section, the screened section being distinct from the pass-through area of the plate and the perforations being smaller than fluid-borne particles.

EXAMPLE #3

Provided can be the downhole assembly of Example #1 (or any of Examples #1-2), wherein at least one of the plates of the plurality of plates is angled from an orientation perpendicular to a central axis of the tubular.

EXAMPLE #4

Provided can be the downhole assembly of Example #1 (or any of Examples #1-3), wherein the plurality of plates comprises at least a first plate and a second plate next in the series to the first plate, the second plate forming a corner between an edge of the second plate and an interior surface of the tubular, the corner longitudinally aligned with a pass-through area of the first plate.

EXAMPLE #5

Provided can be the downhole assembly of Example #1 (or any of Examples #1-4), wherein at least one of the plates of the plurality of plates is elliptically shaped.

EXAMPLE #6

Provided can be the downhole assembly of Example #1 (or any of Examples #1-5), wherein at least one of the plates of the plurality of plates is circularly shaped.

EXAMPLE #7

Provided can be the downhole assembly of Example #1 (or any of Examples #1-6), wherein each pass-through area is angularly offset from a pass-through area of a plate that is immediately preceding or immediately succeeding in the series.

EXAMPLE #8

Provided can be a downhole assembly (or the downhole assembly of any of Examples #1-7), comprising (I) a support structure disposed along a length of a tubular; and (II) a plurality of plates, each plate of the plurality of plates comprising a pass-through area and a closed end opposite the pass-through area, the plates of the plurality of plates coupled with the support structure so that each pass-through area is angularly offset from a proximate pass-through area, so that the pass-through areas of the plurality of plates are tilted toward a first end of the tubular, and so that the closed ends of the plurality of plates are tilted away from the first end of the tubular.

EXAMPLE #9

Provided can be the downhole assembly of Example #8 (or any of Examples #1-7), wherein the support structure comprises a plurality of support structure sections, each support structure section coupled with a corresponding plate of the plurality of plates and coupled with an adjacent support structure section.

EXAMPLE #10

Provided can be the downhole assembly of Example #8 (or any of Examples #1-9), wherein the plurality of plates comprises at least a first plate and a second plate positioned next along the support structure to the first plate, a closed end of the second plate longitudinally aligned with a pass-through area of the first plate.

EXAMPLE #11

Provided can be the downhole assembly of Example #8 (or any of Examples #1-10), wherein at least one of the plates of the plurality of plates comprises a pass-through area that is at least one of: (a) formed through the plate, or (b) formed between an edge of the plate and an interior surface of the tubular.

EXAMPLE #12

Provided can be the downhole assembly of Example #8 (or any of Examples #1-11), wherein the pass-through areas are angularly offset from one another by a uniform amount.

EXAMPLE #13

Provided can be the downhole assembly of Example #12 (or any of Examples #1-12), wherein the uniform amount is approximately 180 degrees.

EXAMPLE #14

Provided can be the downhole assembly of Example #12 (or any of Examples #1-13), wherein the uniform amount is approximately 120 degrees.

EXAMPLE #15

Provided can be a method comprising (I) directing a fluid to flow toward a first end of a tubular and past a first plate in the tubular so that at least some of the fluid flows through a pass-through portion of the first plate and so that at least some particles carried by the fluid are prevented from passing the first plate by a particle-blocking portion of the first plate; and (II) directing the fluid flowing past the first plate to flow past a second plate in the tubular so that at least some of the fluid flows through a pass-through portion of the second plate that is angularly offset from the pass-through portion of the first plate and so that at least some particles carried by the fluid past the first plate are prevented from passing the second plate by a particle-blocking portion of the second plate.

EXAMPLE #16

Provided can be the method of Example #15, wherein directing the fluid to flow toward the first end of a tubular past the first plate so that at least some particles carried by the fluid are prevented from passing the first plate by the particle-blocking portion of the first plate comprises at least one of: (I) trapping particles as fluid passes through a screened portion of the particle-blocking portion of the first plate; or (II) trapping, in a corner formed between the first plate and an interior surface of the tubular, particles directed by the fluid flow along an angle of the first plate toward the corner.

EXAMPLE #17

Provided can be the method of Example #15 (or any of Examples #15-16), wherein directing the fluid flowing past the first plate to flow past the second plate so that at least some particles carried by the fluid past the first plate are prevented from passing the second plate by the particle-blocking portion of the second plate comprises at least one of: (I) trapping particles dropped out of the fluid as the fluid turns to flow through the pass-through portion of the second plate that is angularly offset from the pass-through portion of the first plate; (II) trapping particles as fluid passes through a screened portion of particle-blocking portion of the second plate; or (III) trapping, in a corner formed between the second plate and an interior surface of the tubular, particles directed by the fluid flow along an angle of the second plate toward the corner.

EXAMPLE #18

Provided can be the method of Example #15 (or any of Examples #15-17), further comprising, when particles from the fluid are blocking a screened portion of one of the plates, directing fluid to flow toward the first end of a tubular by directing fluid to flow through a pass-through area of the plate having the blocked screen portion.

EXAMPLE #19

Provided can be the method of Example #15 (or any of Examples #15-18), further comprising directing fluid to flow away from the first end of the tubular to move particles along an angle of an angled plate and away from a position blocking a screened portion of the angled plate.

EXAMPLE #20

Provided can be the method of Example #15 (or any of Examples #15-19), further comprising directing a fluid to flow away from the first end of the tubular to move at least some particles captured in between plates out from between the plates.

The foregoing description, including illustrated aspects and examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of this disclosure.

What is claimed is:

1. A downhole assembly, comprising:
a plurality of plates arranged in a series along a length of a tubular, each plate of the plurality of plates comprising (i) a pass-through area that is angularly offset from a pass-through area of another plate in the series, and (ii) a particulate-blocking area, wherein the particulate-blocking area each plate of the plurality of plates comprises a screened section further comprising perforations through the screened section, the screened section being distinct from the pass-through area of the plate and the perforations being smaller than fluid-borne particles.

2. The downhole assembly of claim 1, wherein at least one of the plates of the plurality of plates is angled from an orientation perpendicular to a central axis of the tubular.

3. The downhole assembly of claim 1, wherein the plurality of plates comprises at least a first plate and a second plate next in the series to the first plate, the second plate forming a corner between an edge of the second plate and an interior surface of the tubular, the corner longitudinally aligned with a pass-through area of the first plate.

4. The downhole assembly of claim 1, wherein at least one of the plates of the plurality of plates is elliptically shaped.

5. The downhole assembly of claim 1, wherein at least one of the plates of the plurality of plates is circularly shaped.

6. The downhole assembly of claim 1, wherein each pass-through area is angularly offset from a pass-through area of a plate that is immediately preceding or immediately succeeding in the series.

7. A downhole assembly, comprising:
a support structure disposed along a length of a tubular; and
a plurality of plates, each plate of the plurality of plates comprising a pass-through area and a closed end opposite the pass-through area, the plates of the plurality of plates coupled with the support structure so that each pass-through area is angularly offset from a proximate pass-through area, so that the pass-through areas of the plurality of plates are tilted toward a first end of the tubular, and so that the closed ends of the plurality of plates are tilted away from the first end of the tubular.

8. The downhole assembly of claim 7, wherein the support structure comprises a plurality of support structure sections, each support structure section coupled with a corresponding plate of the plurality of plates and coupled with an adjacent support structure section.

9. The downhole assembly of claim 7, wherein the plurality of plates comprises at least a first plate and a second plate positioned next along the support structure to the first plate, a closed end of the second plate longitudinally aligned with a pass-through area of the first plate.

10. The downhole assembly of claim 7, wherein at least one of the plates of the plurality of plates comprises a pass-through area that is at least one of: (a) formed through the plate, or (b) formed between an edge of the plate and an interior surface of the tubular.

11. The downhole assembly of claim 7, wherein the pass-through areas are angularly offset from one another by a uniform amount.

12. The downhole assembly of claim 11, wherein the uniform amount is approximately 180 degrees.

13. The downhole assembly of claim 11, wherein the uniform amount is approximately 120 degrees.

14. A method comprising:
directing a fluid to flow toward a first end of a tubular and past a first plate in the tubular so that at least some of the fluid flows through a pass-through portion of the first plate and so that at least some particles carried by the fluid are prevented from passing the first plate by a particle-blocking portion of the first plate, wherein the pass-through portion of the first plate is tilted toward the first end of the tubular and wherein the particle-blocking portion of the first plate is tilted away from the first end of the tubular; and directing the fluid flowing past the first plate to flow past a second plate in the tubular so that at least some of the fluid flows through a pass-through portion of the second plate that is angularly offset from the pass-through portion of the first plate and so that at least some particles carried by the fluid past the first plate are prevented from passing the second plate by a particle-blocking portion of the second plate, wherein the pass-through portion of the second plate is tilted toward the first end of the tubular and wherein the particle-blocking portion of the second plate is tilted away from the first end of the tubular.

15. The method of claim 14, wherein directing the fluid to flow toward the first end of a tubular past the first plate so that at least some particles carried by the fluid are prevented from passing the first plate by the particle-blocking portion of the first plate comprises at least one of:

trapping particles as fluid passes through a screened portion of the particle-blocking portion of the first plate; or trapping, in a corner formed between the first plate and an interior surface of the tubular, particles directed by the fluid flow along an angle of the first plate toward the corner.

16. The method of claim 14, wherein directing the fluid flowing past the first plate to flow past the second plate so that at least some particles carried by the fluid past the first plate are prevented from passing the second plate by the particle-blocking portion of the second plate comprises at least one of:

trapping particles dropped out of the fluid as the fluid turns to flow through the pass-through portion of the second plate that is angularly offset from the pass-through portion of the first plate;

trapping particles as fluid passes through a screened portion of particle-blocking portion of the second plate; or trapping, in a corner formed between the second plate and an interior surface of the tubular, particles directed by the fluid flow along an angle of the second plate toward the corner.

17. The method of claim 14, further comprising, when particles from the fluid are blocking a screened portion of one of the plates, directing fluid to flow toward the first end of a tubular by directing fluid to flow through a pass-through area of the plate having the blocked screen portion.

18. The method of claim 14, further comprising directing fluid to flow away from the first end of the tubular to move particles along an angle of an angled plate and away from a position blocking a screened portion of the angled plate.

19. The method of claim 14, further comprising directing a fluid to flow away from the first end of the tubular to move at least some particles captured in between plates out from between the plates.

20. The A downhole assembly of claim 1 wherein the pass-through areas of the plurality of plates are tilted toward a first end of the tubular, and wherein the particulate-blocking areas of the plurality of plates are tilted away from the first end of the tubular.

* * * * *